United States Patent [19]

Simpson et al.

[11] Patent Number: 4,516,020

[45] Date of Patent: May 7, 1985

[54] LIGHT-OPERATED PROXIMITY DETECTOR WITH LINEAR OUTPUT

[75] Inventors: Marc L. Simpson, Harriman; David R. McNeilly, Maryville, both of Tenn.

[73] Assignee: The United States of America as represented by the United States Department of Energy, Washington, D.C.

[21] Appl. No.: 453,982

[22] Filed: Dec. 28, 1982

[51] Int. Cl.$^3$ .............................................. H01J 40/14
[52] U.S. Cl. .............................. 250/214 L; 250/222.1
[58] Field of Search ............ 250/214 L, 222.1, 211 R, 250/211 K, 206; 330/59, 308; 307/311

[56] References Cited

U.S. PATENT DOCUMENTS 3,843,880 10/1974 Tsuchiyasu ..................... 250/214 L
4,079,331 3/1978 Pinckaers et al. .................... 330/59
4,096,382 6/1978 Numata et al. ................. 250/214 L

*Primary Examiner*—David C. Nelms
*Assistant Examiner*—Jere J. Brophy
*Attorney, Agent, or Firm*—David E. Breeden; Stephen D. Hamel; Judson R. Hightower

[57] ABSTRACT

A light-operated proximity detector is described in which reflected light intensity from a surface whose proximity to the detector is to be gauged is translated directly into a signal proportional to the distance of the detector from the surface. A phototransistor is used to sense the reflected light and is connected in a detector circuit which maintains the phototransistor in a saturated state. A negative feedback arrangement using an operational amplifier connected between the collector and emitter of the transistor provides an output at the output of the amplifier which is linearly proportional to the proximity of the surface to the detector containing the transistor. This direct proportional conversion is true even though the light intensity is varying with the proximity in proportion to the square of the inverse of the distance. The detector may be used for measuring the distance remotely from any target surface.

6 Claims, 2 Drawing Figures

LIGHT-OPERATED PROXIMITY DETECTOR WITH LINEAR OUTPUT

This invention is a result of a contract with the U.S. Department of Energy.

BACKGROUND OF THE INVENTION

This invention relates generally to remote proximity measuring devices and more specifically to light-operated proximity measuring devices.

It is well-known that with a point light source or an incident collimated light beam reflecting from a target surface, the light intensity is proportional to the square of the inverse of the distance. Light transducers used to detect light provide a voltage output proportional to the intensity of the incident light. In the past, it has been necessary to provide a computer or other hardware to make required complex calculations in order to translate this nonlinear voltage into a calibrated distance. Further, because of high thermal drift, measurements made in this manner are rarely reproducible.

Thus, there is a need to provide a light-operated proximity detector which provides direct translation of incident reflected light intensity from a surface into a signal which is directly proportional to the distance without the complex calculations normally required with light-operated proximity detectors.

SUMMARY OF THE INVENTION

In view of the above need, it is an object of this invention to provide a light-operated proximity detector which provides an output signal which is directly proportional to the detected proximity.

Another object of this invention is to provide a light-operated proximity detector as in the above object which provides high resolution, repeatable proximity measurements.

Other objects and many of the attendant advantages of the present invention will be obvious to those skilled in the art from the following detailed description of a preferred embodiment of the invention.

In summary, the invention pertains to a light-operated proximity detector in which light from a source is directed onto a surface whose proximity to the detector is to be gauged. A phototransistor is provided in the detector and is disposed to detect light reflected from the surface on a light sensitive surface of the phototransistor. A biasing means is provided to operate the transistor in a saturated state. An operational amplifier circuit including a resistive feedback network is connected between the collector of the transistor and the emitter of the transistor to provide negative feedback to the emitter electrode and thus, providing a signal at the output of the amplifier which is linearly proportional to the proximity of the detector to the surface being gauged.

The biasing network also limits the current flow through the transistor to a very small value thereby providing excellent thermal stability and highly repeatable proximity measurements.

BRIEF DESCRIPTION OF THE DRAWINGS

The accompanying drawings, which are incorporated in and form a part of the specification together with the description, serve to explain the principles of the invention. In the drawings.

DETAILED DESCRIPTION

Figure 1:
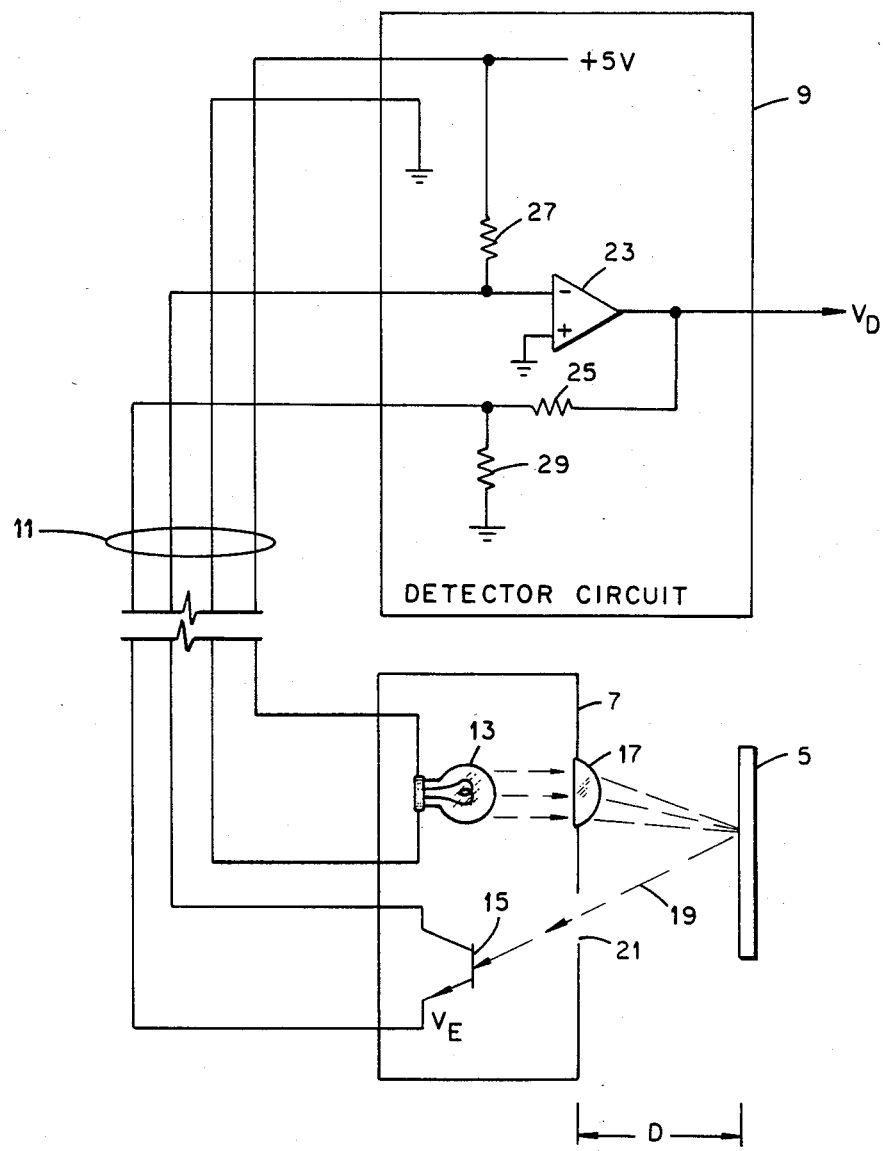
FIG. 1 is a schematic illustration of a light-operated proximity detector according to the present invention.

Referring now to FIG. 1, there is shown a light-operated proximity detector for detecting the proximity of a target surface 5. Although the detector shown in FIG. 1 is in two parts including a remote probe section 7 and a detector circuit portion 9 separated by a multiple lead cable 11, it will be understood that the detector circuit may be housed directly with the remote probe portion depending upon the application. The remote probe 7 includes a light source 13, such as an incandescent lamp. It will be understood that various light sources may be used rather than an incandescent lamp. For example, a laser light source may be substituted for the lamp 13. The only requirement is that the wavelength of the light is such that it is detectable by the particular phototransistor 15 being used to detect the reflected light. The light from the source 13 is directed through a focusing lens 17 which focuses the light onto the remote target surface 5. Light reflected along beam path 19 enters the remote probe housing 7 through an opening 21. The phototransistor 15 is disposed within the housing so that the beam strikes the sensitive area of the base region of the phototransistor 15.

The intensity of the light received at the sensitive region of the transistor 15 causes the collector current to vary according to the incident light intensity. As will be described hereinbelow, the transistor is biased to operate in a saturated mode; thus, the change in current is linearly related to the change in light intensity detected by the sensitive region.

The collector of transistor 15 is connected to the inverting input of an operational amplifier 23 which has its non-inverting input connected to ground potential. The output of the amplifier 23 is connected through a resistor 25 to the emitter of transistor 15. Transistor 15 is biased to operate in a saturated mode by connecting a +5 volt supply through a large (18 megohms) resistor 27 to the collector of transistor 15. The emitter of transistor 15 is connected through a resistor 29 to ground potential. In this arrangement, the +5 volt supply is also connected to operate lamp 13, these connections being made through the multiple lead cable 11 connecting between the remote probe 7 and the detector circuit housing 9.

The circuit configuration shown in FIG. 1 can force the phototransistor 15 into saturation by forcing a virtual ground at the inverting input of amplifier 23 due to the input characteristics of an operational amplifier, thereby biasing the collector at essentially 0 volt. Further, by feeding back the output of amplifier 23 in a negative feedback arrangement to the emitter of transistor 15, the emitter is forward biased at a negative voltage ($V_E$) described by the equation:

$$V_E = V_D \times R29 / R25 + R29$$

where $V_D$ is the output of amplifier 23 which is a signal proportional to the distance D shown in FIG. 1.

These two saturation steps force the base collector junction of transistor 15 to be forward biased and the base to emitter junction to also be forward biased thereby ensuring that the transistor 15 operates in a saturated, or nonlinear mode. Thus, the input light intensity is translated nonlinearly into an output voltage $V_D$ which is directly proportional to the distance D, not the intensity of the reflected light beam 19. It should be pointed out here that it is not clearly understood why the output voltage of amplifier 23 ($V_D$) is a linear function of the distance D. However, it has been shown in tests as will be shown in the example hereinbelow, that this result is clearly obtained.

Further, since there is a "virtual ground" created due to the noninverting input of operational amplifier 23 being tied to ground, there is essentially a 5 volt-drop cross the resistor 27. Since this resistance is quite large ($12 \times 10^6$ ohms), the current through the saturated phototransistor is extremely small. Thus, thermal instability (heat dissipation) due to large current flows through the phototransistor is eliminated.

It is, therefore, important in the operation of the invention to consider that the saturation which provides a nonlinear conversion of the reflected light intensity into distance D is accompanied by a current limitation which provides for low-power dissipation and thereby giving the added benefit of thermal stability which allows highly repeatable distance measurements.

In operation, the small changes in collector current due to changes in intensity of the reflected beam 19 caused by changes in the distance D, forces a small change in the collector to emitter voltage which is input to the inverting input of amplifier 23. These positive voltage changes across the transistor 15 are sufficient to provide the output voltage $V_D$ which is directly proportional to the distance D. Although the illustrated embodiment employs an NPN transistor 15, it will be understood that a PNP type transistor may be substituted by changing the supply voltage to a negative supply. This, in turn, causes small negative voltage fluctuations at the inverting input of amplifier 23 thereby providing a positive output signal $V_D$. This positive voltage would be fed back in a negative feedback arrangement to the emitter of the PNP transistor forcing the required forward bias condition.

Figure 2:
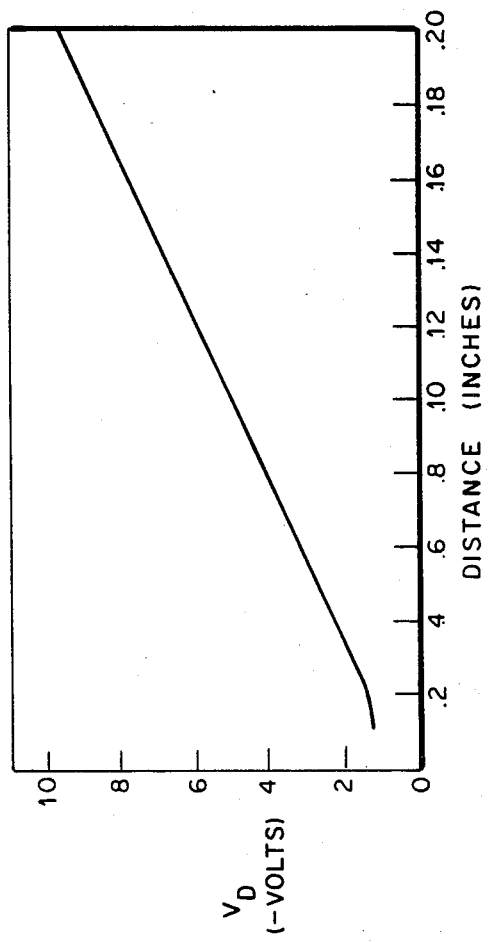
FIG. 2 is a plot illustrating the linear output of the detector with respect to proximity of the detector to a surface being gauged.

The light probe as shown in FIG. 1 was tested by varying the target distance (D) relative to the probe housing from 0.1 to 2 inches. The results of this test are shown in FIG. 2 which is a plot of the output voltage $V_D$ versus the distance D from a flat white surface. This graph clearly shows the linearity of the output signal to distance D.

It has been found that the maximum displacement (D) that the probe may be located from a surface to obtain usable displacement measurements is about 3 inches. The maximum sensitivity, i.e., measurement of the smallest increment of variation of the displacement of the target surface is approximately 10 mV/mil.

In a specific test of the circuit for measuring small deviations in runout of a rotating object, such as a rotating wheel, the detector provided clearly repeatable measurements of runout in the range of 1 mil with the probe fixed an average distance (D) of 0.250 inch from the periphery of the wheel.

Thus, it will be seen that a very simple and inexpensive lightoperated proximity detector has been provided which provides a direct converted linear output signal which is proportional to the calibrated distance to a surface even though the sensed light intensity from the surface varies non-linearly with the distance. In addition, the detector provides high resolution, repeatable measurements due to the unique combination of operating a phototransistor sensor in the saturated region while limiting the collector current to a very small value to prevent thermal drift.

Although a preferred embodiment of the invention has been described using specific terms, such description is for illustrative purposes only, and it is to be understood that changes and variations may be made without departing from the spirit or scope of the following claims.

What is claimed is:

1. A light-operated proximity detector, comprising:
   a light source;
   focusing means for focusing a beam of light from said light source onto a surface whose proximity to said detector is to be gauged;
   a phototransistor having emitter and collector electrodes and disposed to receive a reflected portion of said beam from said surface at a light-sensitive surface thereof;
   biasing means for biasing said transistor to operate in a saturated state;
   an operational amplifier having an inverting input connected to the collector of said phototransistor, a non-inverting input connected to ground potential and an output;
   a resistance feedback network coupled between the output of said amplifier and said emitter electrode of said phototransistor so that a signal at the output of said amplifier is produced which is linearly proportional to the proximity of said surface to said detector.

2. The detector as set forth in claim 1 wherein said biasing means further includes means for limiting the collector current of said phototransistor to prevent variations in collector current due to thermal drift.

3. The detector as set forth in claim 1 wherein said biasing means and said resistance feedback network include a bias voltage source, a first resistor connected between said voltage source and said collector electrode of said phototransistor and of sufficient resistance to limit the collector current of said phototransistor to prevent variations in collector current due to thermal drift, a second resistor connected between said emitter of said phototransistor and ground potential, and a third resistor connected between the output of said amplifier and said emitter electrode of said phototransistor and of sufficient resistance relative to the resistance of said second resistor to bias the emitter electrode of said phototransistor at a voltage sufficient to maintain said phototransistor in said saturated state.

4. The detector as set forth in claim 3 wherein said light source and said phototransistor are disposed in a remote probe housing, said housing having an aperture therein for the passage of said reflected beam onto said sensitive region of said phototransistor.

5. The detector as set forth in claim 4 wherein said light source in an incandescent lamp and said focusing means includes a beam focusing lens disposed between said lamp and said surface.

6. The detector as set forth in claim 5 wherein said surface is a moving surface and said probe housing is fixedly disposed in proximity to said moving surface to detect changes in displacement of said moving surface relative to said probe housing.

* * * * *